May 27, 1941.  A. SLATIS ET AL  2,243,360
FILTER OR MEDICAMENT CASING
Filed Dec. 30, 1938
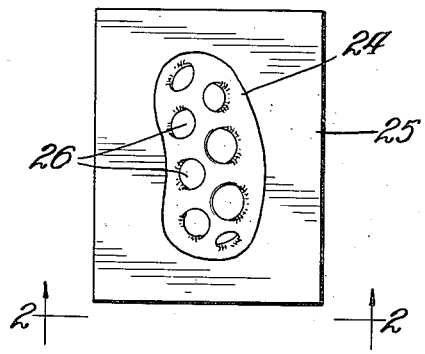
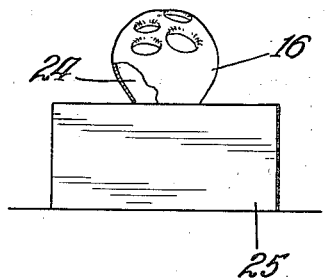
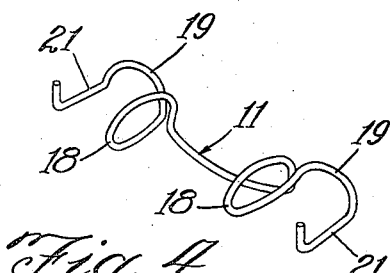
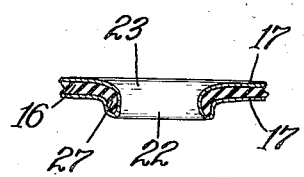
Inventors:
Abraham Slatis
and Harry H. Asher
By: [signature] Atty.

Patented May 27, 1941

2,243,360

UNITED STATES PATENT OFFICE 2,243,360

FILTER OR MEDICAMENT CASING

Abraham Slatis and Harry H. Asher, Chicago, Ill.

Application December 30, 1938, Serial No. 248,375

4 Claims. (Cl. 128—148)

This invention has to do with improvements in casings insertable into an anatomical passage for holding a filter and/or medicament therein, and relates particularly to a device comprising a pair of such casings connected by a bridge and shaped to fit closely respectively within the nasal passages of a patient. The invention further relates to a novel process of making our improved casing.

Heretofore, so far as we are aware, nasal casings for filters and medicaments have been constructed in such form or shape and of such materials as to cause much discomfort to the wearer or patient. In some instances the casings have been made of metal that eventually irritates the mucous membrane with which it comes in contact. Another disadvantage of the metal casing is its comparative rigidity and consequent inability to yield under pressure of the nostril wall for fitting evenly and comfortably there against. Contrarily, such metal casings usually distort the nostril wall and thus strain the tissue wherefore muscular fatigue and discomfort follow.

A primary object of the present invention is the provision of a nasal casing or the like which exposes a surface that is non-irritant and otherwise innocuous to mucous membrane, and which is easily distortable for minimizing strain within areas of concentrated pressure upon the nostril wall.

Another object of the present invention is the provision of an improved nasal casing or the like which is extremely light in weight and in this enabling it to be worn without annoyance and distraction.

Another object of the present invention is the provision of a novel casing of the class herein described which is substantially concealed while worn, and which retains completely out of view a filter pad adapted to be received thereby.

Another object of the present invention is the provision of a new casing of the class herein described which includes means for withholding filter fibers against promiscuous projection through casing wall apertures into engagement with the mucous membrane.

Still another object of this invention is the provision of a new casing of the class herein described which has a laminated wall structure wherein there is a readily flexible and distortable foundation lamina coated with a thin reinforcing lamina of material innoxious to mucous membrane.

And a still further object of the present invention is the provision of a novel process of making the herein described casing.

The above and other desirable objects of the invention will become fully apparent while reading the following description with reference to the single sheet of drawing, which constitutes a part of this specification and wherein:

Fig. 1 is a plan view of a mold employed in the process of constructing a casing embodying the principles of our invention;

Fig. 2 is a side elevation taken on the line 2—2 of Fig. 1;

Fig. 3 is an enlarged fragmentary view, partly in section, illustrating the inturned flanges about the end wall apertures in our improved casing;

Fig. 4 is a perspective view of a bridge member adapted for unitary assembly with a pair of said casings;

Fig. 5 is a sectional view taken transversely through an assembled device comprising nasal filter casings and illustrating the character of their assembly with the bridge member of Fig. 4; and Fig. 6 is a fragmentary profile view illustrating the manner in which the device of Fig. 5 is fitted to the nostril of a wearer.

The same reference characters where appearing in various figures of the drawing and throughout the following description designate the same respective structural parts.

Although the casings herein described are shaped to fit the lower internal section of a human nostril, and to that end are illustrated as a part of a nasal device, it is to be understood that such casings per se may be made of any desired size and contour for comfortable disposal in any passage of the body. It should be further understood that the device herein disclosed may be employed as a receptacle for a medicament as well as filter material, and, in this respect, is a curative device as well as preventative.

Referring now to the drawing, and particularly to Fig. 5, nasal casings 10 will be seen mounted upon opposite ends of a bridge member 11. Said casings 10 are alike in structure except for the fact that they are shaped respectively for the right and left nostrils.

Each casing 10 has a side wall 12 and an apertured end wall 13. Said side walls converge toward openings 14 (opposite the apertured end walls 13) and are otherwise shaped to substantially correspond in contour with the pocket-like peripheral section 15, Fig. 6, adjacent to the lower end of a nostril. The walls of such casings are laminated, there being a foundation lamina 16 of latex rubber which forms the main body of the walls, and coating laminae 17 of Cellophane, Celluloid or any suitable material which is non-irritable and non-injurious to mucous membrane tissue.

The lamination 16 lends to the casing walls a character of flexibility to enable them to change their shape under pressure impressed thereon by the nostril walls and consequently adjust themselves for diminishing any discrepancy between their peripheral contours and that of the nostrils. When such casings thus conform to the nostril walls over a large contiguous area, in contra-distinction to a small area or areas, points of concentrated pressure are avoided and comfort of the wearer is increased. Moreover, leakage of unfiltered air between the casing and nostril walls is thus minimized. The thin laminations 17 of less flexible material prevent collapse of the shells or casings.

Two loops 18 are formed in the bridge member 11 which may be made of stainless steel or other relatively non-corrosive material. Those sections of the wire-like bridge member 11 adjacent to and beyond the loops 18 are arched to provide filter retention members with bits 19 for pressing against bodies 20 of filter material. Reverse bend sections 21 are effected near the ends of said bridge member. If desired, said bridge member may be extended at its ends to provide additional bits (not shown) substantially congruent with and spaced laterally from the bits 19.

The loops 18 and the reverse bend sections 21 may be anchored to those parts of the casing side walls engaged thereby in some such manner as by applying thereto a small quantity of liquid Cellophane and permitting the same to solidify.

In turned flanges 22 are provided about the end wall apertures 23 to trammel promiscuous fibers of the filters and thus prevent their projecting outwardly through such apertures where they could otherwise contact and irritate the nasal wall.

In order that the casings conform to the lower internal section of a nasal cavity it is necessary that the side walls thereof converge inwardly toward their end openings 14. The opening 14 in a casing is, therefore, a constricted opening, and to enable the making of such a casing with a restricted opening without the use of a collapsible mold, the rubber employed in the lamination 16 is elastic so it may be expanded while being removed from the mold.

In the making of these casings a mold such as 24, Fig. 1, having a base 25 is employed. Said mold 24 is the facsimile of an impression taken from the lower end of a nasal cavity. It has been found that for the most part all nasal cavities are similar in shape although there is considerable variation in the size of such cavities of different adult people. Also there is a difference in the size of nasal cavities of children and adults. It has been found expedient, therefore, and practical to form the foundation lamination for our casings upon molds 24 similar in shape but graduated in size. With the exception of singular instances, when the patient is fitted with the proper size casing, any slight variation in the contour of his nasal cavity will be compensated for by the flexibility of such casing.

Right-hand and left-hand molds 24 are employed for respectively forming the foundation laminations for casings fittable to the right-hand and left-hand nasal cavities. Each mold has therein a plurality of recesses 26. In the process of manufacturing the casings these molds are first painted with a coating of liquid latex rubber as illustrated in Fig. 2, this coating being designated 16. A portion of this coating, while in the fluid or plastic state is permitted to flow over the brim of the recesses 26 to form the flange portions 27, Fig. 3, of the lamination 16. Subsequent to solidification, the foundation latex lamination 16 is removed from its mold 24 incident to stretching the material about the constricted opening therein to permit withdrawal of the mold 24 therethrough. Thereafter the shell-like lamination 16 thus formed is coated with the laminations 17 of cellulosic material by a spraying or dipping process. Finally, a pair of the thus completed casings are assembled with a bridge member 11 in the manner hereinabove described.

Bodies of filter material 20 may be inserted within the casings in some such position as illustrated in Fig. 5. It will be noted that such bodies of material are readily removable and replaceable by similar fresh bodies. Also, it should be noted that the retaining sections 19 of the bridge member 11 hold the filter bodies well upwardly into the casings 10, whereby they are completely concealed while the device is in service upon a patient.

We claim:

1. A casing of the class described comprising an end wall provided with one or more openings, a side wall, and a layer of material substantially non-irritatable to mucous membrane covering the exterior periphery of said walls, said side wall approximating in contour the inner periphery of an anatomical passage for reception thereof and being readily distortable by pressure of the passage wall to facilitate conformity to such inner periphery when inserted in said passage, there being a constricted opening at the end of said casing opposite to said end wall, and said side wall being convergent toward said opening.

2. A casing of the class described comprising laminated end and side walls, the laminations of said walls including an outer shell of material innocuous to mucous members, and a foundation shell of elastic material within said outer shell, said end wall having one or more apertures therein, there being a constricted opening at the end of said casing opposite to said end wall, and said side wall being convergent toward said opening.

3. A casing of the class described comprising a side wall, an apertured end wall, and an inturned flange about the edge of the aperture or apertures in said end wall.

4. A medicament or filter casing for use in an anatomical passage, comprising an end wall provided with one or more openings, a side wall, and a layer of flexible material substantially non-irritatable to mucous membrane covering the exterior periphery of said walls, said side wall being formed of an organic resilient material and approximating in contour the inner periphery of such passage and sufficiently thin to be readily distorted laterally by pressure from the wall of such passage to cause said side wall to more nearly conform to said periphery thereof, there being a constricted opening at the end of said casing opposite to said end wall, and the side wall being convergent toward said opening.

ABRAHAM SLATIS.
HARRY H. ASHER.